(12) United States Patent
Li et al.

(10) Patent No.: US 9,154,039 B2
(45) Date of Patent: Oct. 6, 2015

(54) SWITCHING POWER CONVERTER WITH SECONDARY-SIDE DYNAMIC LOAD DETECTION AND PRIMARY-SIDE FEEDBACK AND CONTROL

(71) Applicant: iWatt Inc., Campbell, CA (US)

(72) Inventors: Yong Li, San Jose, CA (US); Jiang Chen, Cupertino, CA (US); Junjie Zheng, Santa Clara, CA (US); Jianming Yao, San Jose, CA (US); Xiaolin Gao, Santa Clara, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 122 days.

(21) Appl. No.: 14/030,845

(22) Filed: Sep. 18, 2013

(65) Prior Publication Data

US 2014/0078789 A1    Mar. 20, 2014

Related U.S. Application Data

(60) Provisional application No. 61/703,527, filed on Sep. 20, 2012.

(51) Int. Cl.
*H02M 3/335* (2006.01)
*H02M 1/00* (2007.01)

(52) U.S. Cl.
CPC ...... *H02M 3/33507* (2013.01); *H02M 3/33523* (2013.01); *H02M 2001/0019* (2013.01); *H02M 2001/0032* (2013.01); *Y02B 70/16* (2013.01)

(58) Field of Classification Search
CPC .................................................. H02M 3/33507
USPC ........... 363/21.01, 21.12, 21.15, 21.16, 21.17
See application file for complete search history.

(56) References Cited

U.S. PATENT DOCUMENTS

| | | | |
|---|---|---|---|
| 6,909,616 B2 * | 6/2005 | Kim ................................ | 363/16 |
| 7,542,308 B2 * | 6/2009 | Yamada ..................... | 363/21.01 |
| 7,782,638 B2 * | 8/2010 | Murata et al. ............. | 363/56.11 |
| 2012/0176818 A1 * | 7/2012 | Gati ........................... | 363/21.07 |
| 2013/0301310 A1 * | 11/2013 | Wang et al. ................ | 363/21.12 |

* cited by examiner

*Primary Examiner* — Matthew Nguyen
(74) *Attorney, Agent, or Firm* — Fenwick & West LLP

(57) ABSTRACT

A power converter includes a transformer with a primary and a secondary winding. Feedback and control is maintained on the primary-side while a separate load detection circuit detects dynamic load conditions on the secondary-side. The load detection circuit detects dynamic load conditions at the time when a load is connected to the output of the switching power converter and, in turn, generates an alert signal. A coupling circuit coupled to the load detection circuit at the secondary winding side of the transformer and to the controller at the primary winding side of the transformer transmits the alert signal to the controller. The controller regulates the output voltage based on the feedback signal generated at the primary side of the transformer while detecting and responding to the dynamic load condition based on the alert signal generated at the secondary side of the transformer.

18 Claims, 15 Drawing Sheets

SWITCHING POWER CONVERTER WITH SECONDARY-SIDE DYNAMIC LOAD DETECTION AND PRIMARY-SIDE FEEDBACK AND CONTROL

CROSS-REFERENCE TO RELATED APPLICATIONS

This application claims the benefit under 35 U.S.C. §119(e) from U.S. Provisional Patent Application No. 61/703,527 filed on Sep. 20, 2012 and entitled, "Switching Power Converter with Secondary-Side Dynamic Load Detection and Primary-Side Feedback and Control," which is incorporated by reference herein in its entirety.

BACKGROUND

This invention relates generally to power supply regulation and more particularly to secondary dynamic load detection with primary-side sensing and feedback.

Pulse width modulation (PWM) and pulse frequency modulation (PFM) are conventional technologies used for controlling switching power converters to achieve output power regulation. These conventional technologies may regulate the switching power convert to achieve constant voltage and constant current output regulation. A conventional flyback power converter includes a power stage for delivering electrical power from a power source to a load. A switch in the power stage electrically couples and decouples the load to and from the power source. A switch controller coupled to the switch controls the on-time and off-time of the switch, otherwise known as the duty cycle. The on-time and off-time of the switch may be modified based upon a feedback signal representing the output power, output voltage or output current by the controller to regulate the same. Input energy from the power source is stored in the gap of a transformer when the switch is on and is transferred to the load when the switch is off. Regulation can be accomplished by measuring the output current (or voltage) and feeding the measured output current (or voltage) back to a primary side controller, which can be used to modify the on-time and off-time of the switch of the switching power converter accordingly.

In order to improve cost performance and reduce over-all size, many commercially available isolated power supplies employ primary-only feedback and control. In primary-only feedback and control, secondary output and load conditions are detected by sensing primary side signals during each "ON" and "OFF" cycle and then controlled and regulated. This includes both constant voltage and constant current modes of operation.

However, many electronic devices require power supplies to provide a controlled and regulated power source over a wide range of operating conditions, which adds to the difficulty of primary-side sensing and control. Portable electronic devices such as smartphones and tablet computers are examples of such devices.

FIG. 1 illustrates an operating curve of an example switching power converter used to provide a controlled and regulated output to a load. Operating conditions presented to the switching power supply may occur while a load such as an electronic device is coupled to the power supply or when no-load is present. For example, in a Constant Voltage Mode (CVM) 101, the switching power supply supplies a regulated DC output of a fixed voltage within a certain tolerance range 104. CVM 101 operation generally indicates that the internal battery of the electronic device coupled to the power supply has been fully charged and the fixed voltage output of the power supply provides the operating power for the electronic device to be operated normally.

In a Constant Current Mode (CCM) 102, the power supply provides a fixed current output. CCM 102 operation generally indicates that the internal battery of the electronic device is not fully charged and the constant current output from the power supply allows for the efficient charging of the internal battery of the electronic device.

Lastly, in a No-Load condition 103, the electronic device is disconnected from the power supply. Under the No-Load condition 103, the switching power supply may maintain a regulated voltage output within the CVM range 104 in anticipation of an electronic device being reconnected to the power supply.

For convenience, end users oftentimes leave power supplies connected to the AC mains at times when no load is connected to the power supply output. Because the power supply should maintain a regulated output voltage even in no-load conditions, a dual-mode control methodology is commonly employed. During periods when a nominal load is coupled to the power supply, pulse width modulation is employed.

However, when a load approaches the no-load condition, it is difficult to maintain a duty-cycle low enough to maintain output regulation within the desired tolerance range 104. Accordingly, a pre-load, or dummy load may be added, however, the dummy load reduces operational efficiency during no-load conditions such that power consumption levels of the power supply are negatively impacted. Furthermore, because power supplies are oftentimes connected to the AC-mains for long periods of time when they are not connected to the electronic device, government and environmental agencies have placed maximum limits on the no-load power consumption.

One technique for control and regulation of low load or no-load conditions is for the controller to switch from PWM to PFM. Under no-load conditions in PFM, the rate of the pulses that turn on or off the power switch of the switching power converter is decreased significantly in order to maintain output voltage regulation, resulting in long periods of time between "ON" and "OFF" cycles of the switching power converter. This presents a significant challenge to primary-side sensing control schemes that rely on the "ON" and "OFF" cycles of the power switch to obtain a feedback signal. During the periods between "ON" and "OFF" cycle, the status of the output voltage may be unknown by the controller as no feedback signal is available. The lack of a feedback signal is especially concerning in the event the electronic device is reconnected to the power supply from a no-load condition. The reconnection of the electronic device presents a dynamic load change, and as a result of the long periods where the primary-side controller is unaware of the state of the secondary side output voltage, the power supply may ineffectively react to the load change. A poor dynamic load response in the above case would cause the output voltage to drop upon reconnection of the electronic device to the switching power converter. In some instances, this may cause the undesired affect of the amount of output voltage drop exceeding the regulation specifications. A dynamic load change may also present a significant challenge to switching power supplies that employ secondary output sensing.

FIG. 2 illustrates a conventional switching power converter 200 with a secondary-side feedback circuit 204. AC power is received from an AC power source (not shown) and is rectified to provide the regulated DC input voltage V_IN across input capacitor C0. The input power is stored in transformer T1 while the switch SW is turned on during the "ON" cycles because the diode D1 becomes reverse biased. The rectified AC input power is then transferred to the load L1 across the capacitor Co while the switch SW is turned off during the "OFF" cycles because the diode D1 becomes forward biased.

Secondary-side feedback circuit 204 comprises a compensation network of R1, R2 and RC circuit 209 including resistor R3 and capacitor C1, a reference device (not shown) for supplying reference voltage V_REF and a driver (e.g., an operational amplifier) 207 for driving an opto-isolator 205. The compensation network typically comprises an RC network 209 for closed-loop control and regulation.

The primary side of opto-isolator 205 is coupled to the feedback pin FB of controller 201 and conducts based on the voltage (nominally high) on the secondary side of the opto-isolator 205. Driver 207 provides the feedback voltage to the FB pin of controller 201 through the opto-isolator 205 while the regulated output voltage 203 reaches a regulation threshold at node N1 as compared to V_REF. As switch 202 turns 'ON' and 'OFF', the controller 201 utilizes the feedback on the feedback pin FB to determine a duty cycle of the power converter for controlling the switch 202.

It would seem natural to assume that since secondary feedback circuit 204 is directly coupled to regulated output 203, that the illustrated secondary-side feedback circuit 204 should be uniquely suited to respond to dynamic load changes. However, since secondary feedback circuit 204 is an integral part of the feedback and control loop, care must be taken to insure loop stability and prevent oscillation. Consequently, in designing a typical control feedback loop, there is a trade-off between loop stability and response time bandwidth.

FIGS. 3A, 3B, and 3C illustrate example waveforms corresponding to power converter 200 with secondary-side feedback circuit 204. FIG. 3A illustrates a time t_1 where a load LOAD placed on power supply 200 output 203 dynamically changes, drawing 100% rated output current from a previous 0% rated output current. The increase in current draw at the output 203 causes a decrease in the voltage V_OUT across the load LOAD at a rate largely based on the output current and output filter capacitance C2. As illustrated by FIG. 3B, to minimize the magnitude of the voltage drop (V_Drop1) of regulated output 203 and recovery time of the regulated output voltage V_OUT, the bandwidth of secondary feedback circuit 204 may be maximized. However, if the bandwidth is too wide, the control loop of power supply 200 may become instable in certain operating conditions. Instability of the control loop may result in adverse regulated output 203 conditions such as V_out oscillations. Conversely, as illustrated by FIG. 3C, when the bandwidth of secondary feedback circuit 204 is reduced to maintain control loop stability, the magnitude of the voltage drop (V_Drop) of regulated output 203 increases, causing the power supply 200 to approach or exceed the regulation specification. Moreover, the secondary-feedback circuit 204 and opto-isolator 205 are normally in the "ON" state in order to achieve feedback and control regulation. These devices may consume a substantial amount of power, even under the no-load condition.

SUMMARY

Embodiments described herein include a system and method for a switching power converter with secondary-side dynamic load detection and primary-side feedback and control.

Embodiments include a transformer coupled between an input and an output of the switching power converter, the transformer including a primary winding coupled to the input to receive an input voltage and a secondary winding coupled to the output of the switching power converter; a switch coupled to the primary winding of the transformer, current through the primary winding being generated while the switch is turned on and not being generated while the switch is turned off; a controller at a primary winding side of the transformer and configured to generate a control signal to turn on or turn off the switch, the switch being turned on responsive to the control signal being in a first state and the switch being turned off responsive to the control signal being in a second state; a feedback circuit at the primary winding side of the transformer and configured to generate a feedback signal indicative of an output voltage at the output of the switching power converter; a load detection circuit at a secondary winding side of the transformer and separate from the feedback circuit, the load detection circuit configured to detect a dynamic load condition at the output of the switching power converter occurring at a time when a load is connected to the output of the switching power converter, the load detection circuit further configured to generate an alert signal indicative of the detected dynamic load condition; a coupling circuit coupled to the load detection circuit at the secondary winding side of the transformer and to the controller at the primary winding side of the transformer, the coupling circuit configured to transmit the alert signal generated by the load detection circuit to the controller; and wherein the controller is configured to regulate the output voltage based on the feedback signal generated at the primary side of the transformer while detecting and responding to the dynamic load condition based on the alert signal generated at the secondary side of the transformer.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

Figure 1:
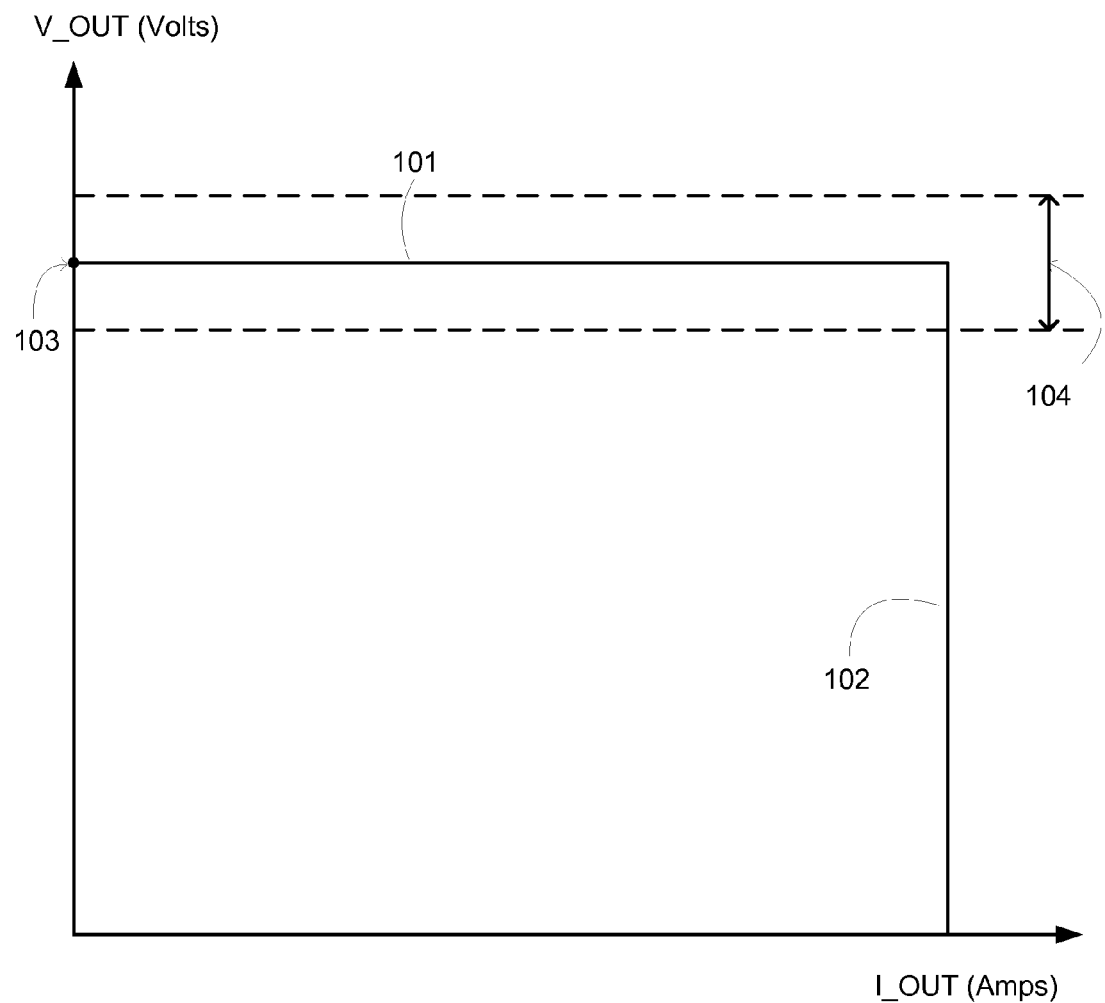
FIG. 1 illustrates an operating curve of an example switching power converter used to provide a controlled and regulated output to a load.
Figure 2:
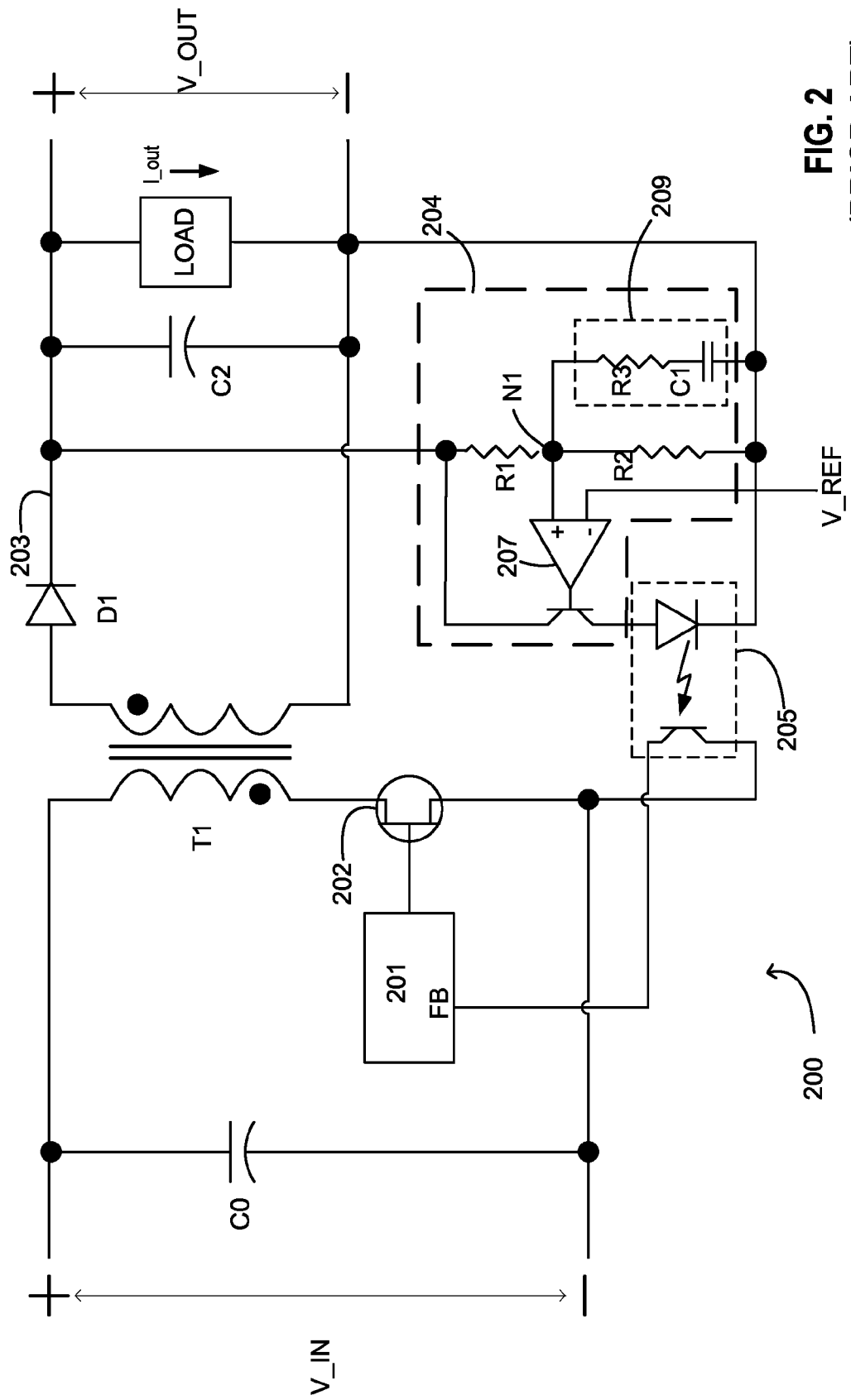
FIG. 2 illustrates an example power converter with secondary-side feedback.
Figure 3A:
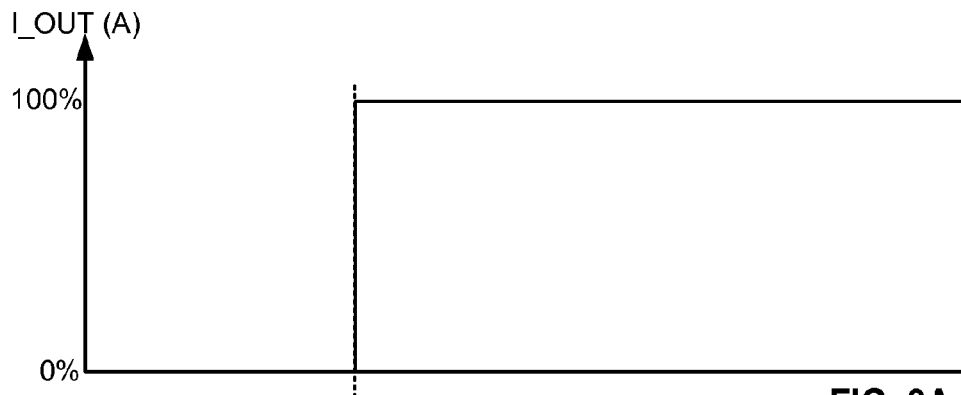
FIGS. 3A, 3B, and 3C illustrate example waveforms corresponding to a power converter with secondary-side output sensing and feedback.
Figure 3B:
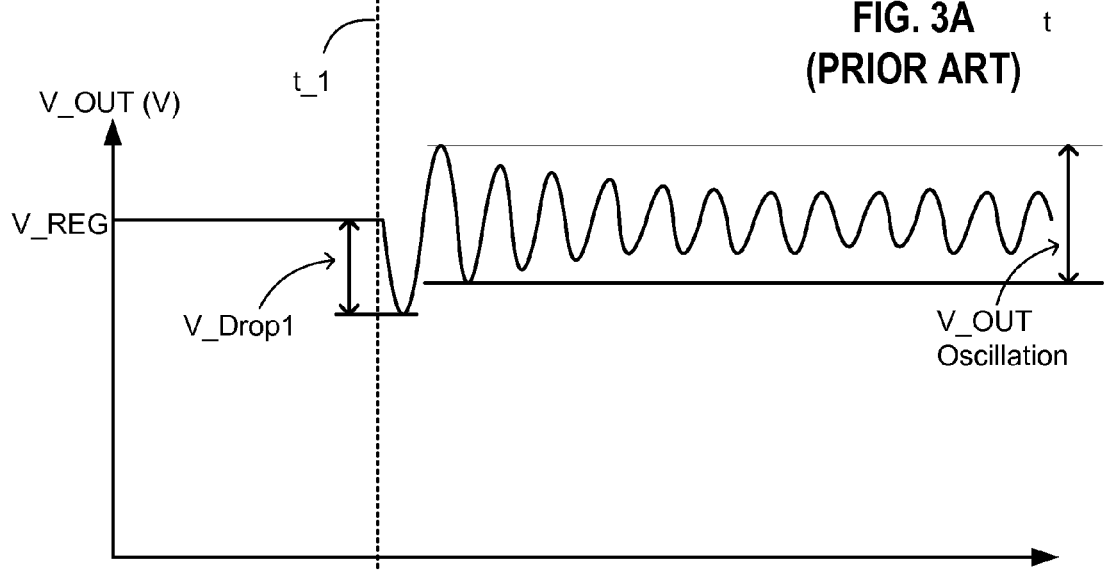
Figure 3C:
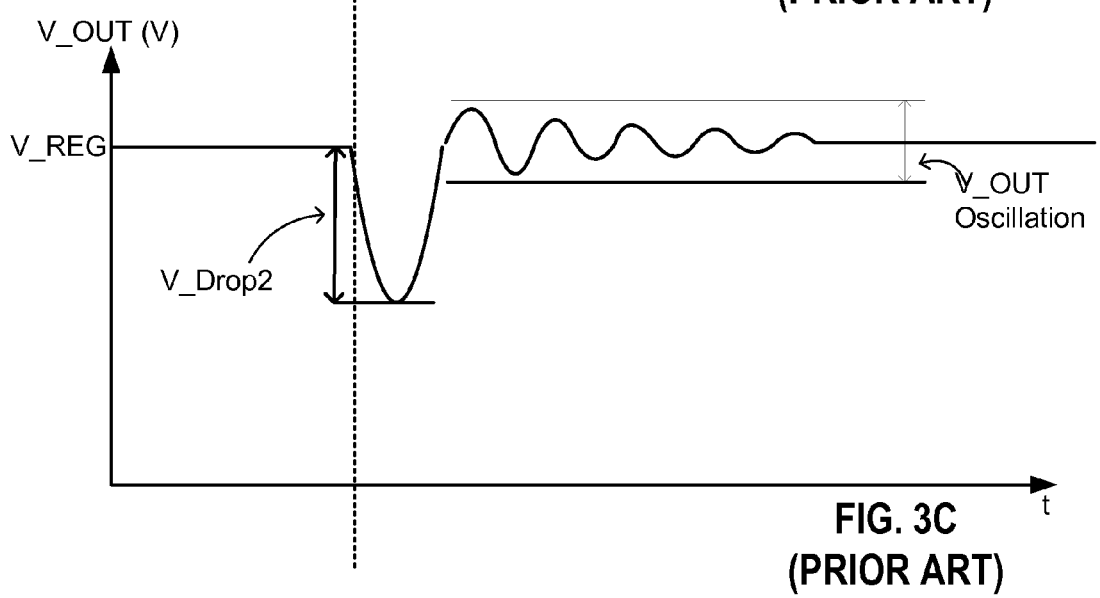

The figures depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION OF EMBODIMENTS

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Overview

Embodiments of power supplies described herein may be configured for secondary-side dynamic load detection in a flyback power converter while employing primary-side feedback and control. A secondary-side load detection circuit senses when a dynamic load has been placed on the output of the secondary side of the flyback power converter. Configurations of the load detection circuit may distinguish the dynamic load condition from other normal operating conditions or fault conditions.

Once a dynamic load condition is detected, the load detection circuit generates a signal corresponding to the dynamic load condition and transmits the signal to a controller on the primary side of the power converter. Configurations of the load detection circuit allow for maximum bandwidth so as to generate the signal proximate to coupling of the dynamic load. The controller, in turn, may take appropriate control actions upon detection of the dynamic load conditions.

While the dynamic load condition is sensed on the secondary side of the switching power converter, sensing of the output voltage for general output regulation by modifying the on and off time of the power switch in the flyback converter is carried out on the primary side through the auxiliary winding.

Configurations of the load detection circuit described herein further relate to detection and signaling schemes for dynamic load conditions which do not interfere or impact a control loop or negatively impact loop stability.

Configurations of the load detection circuit described herein further relate to detection and signaling schemes for dynamic load conditions which are normally in an inactive (e.g., OFF) state and activate signaling and/or other power consuming functions when a drop in the output voltage is detected. Accordingly, the dynamic load detection scheme herein minimally impacts power consumption, including during no-load operation.

Secondary-Side Dynamic Load Detection

Figure 4:
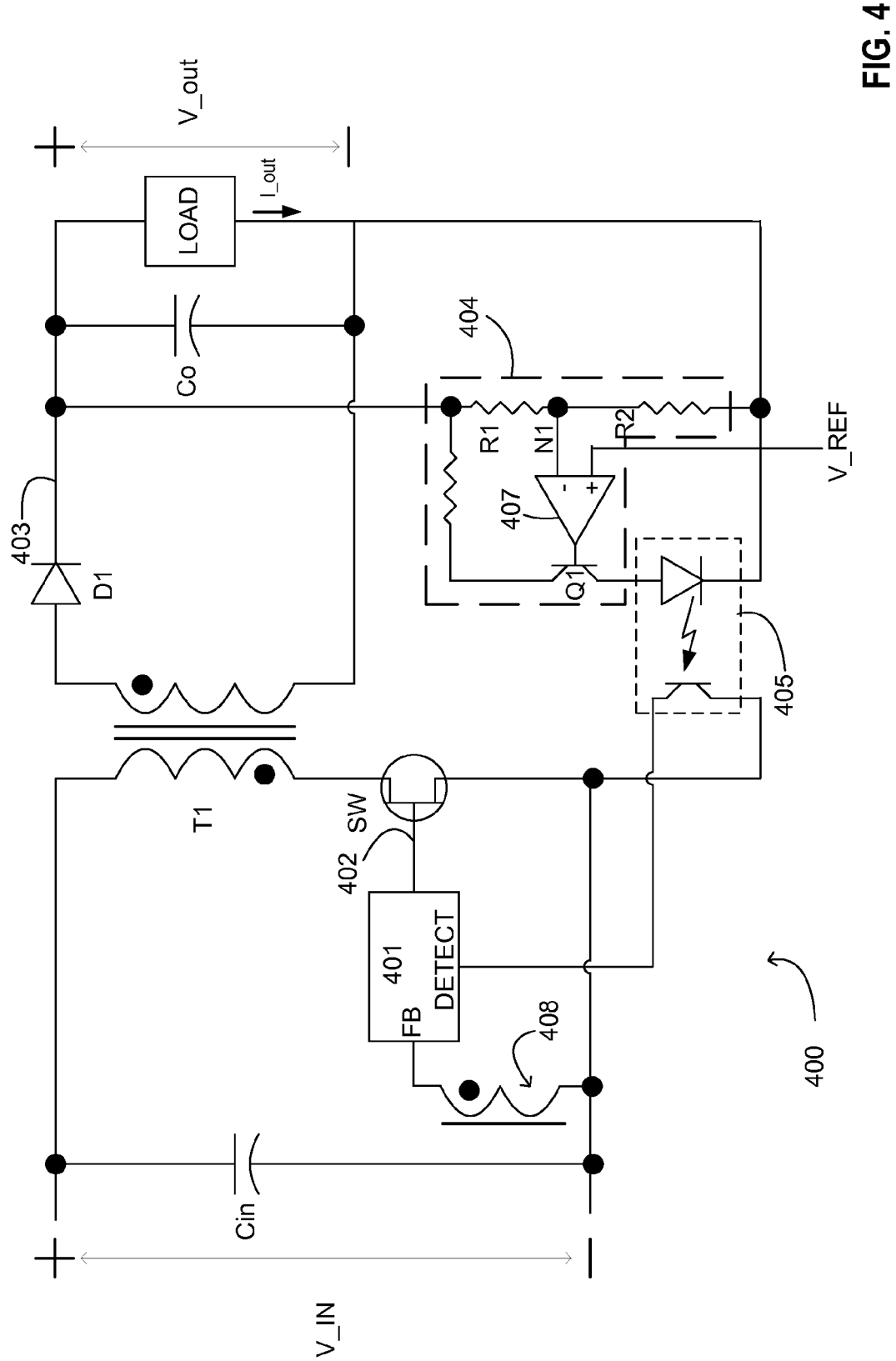
FIGS. 4, 5A, 5B, 5C, 6A, 6B, 6C, 7, 8A, 8B, 9, 10A and 10B illustrate embodiments of various example power converters with secondary-side dynamic load detection and primary-side feedback and control.

FIG. 4 illustrates an example embodiment of a flyback power converter 400 with a secondary-side dynamic load detection circuit 404 and primary-side feedback and control. Primary-side controller 401 provides a drive signal which defines the "ON" and "OFF" cycles at terminal 402 of the switch SW. The controller 401 generates the drive signal at the operating frequency of the switching power converter and regulates the output voltage V_out across a load LOAD coupled to the output 403 of the switching power converter 400 based on a primary-side feedback signal received at the feedback pin FB of the controller 401. The primary-side feedback is received through an auxiliary winding 408 of transformer T1. The auxiliary winding 408 provides a feedback signal representative of output voltage on the secondary winding of transformer T1 to the feedback pin FB of the controller 401.

AC power is received from an AC power source (not shown) and is rectified to provide the regulated DC input voltage V_IN across input capacitor Cin. The input power is stored in transformer T1 while the switch SW is turned on during the "ON" cycles because the diode D1 becomes reverse biased. The rectified AC input power is then transferred to the load L1 across the capacitor Co while the switch SW is turned off during the "OFF" cycles because the diode D1 becomes forward biased. Diode D1 functions as an output rectifier and capacitor Co functions as an output filter. Controller 401 can employ any one of a number of well-known modulation techniques, such as pulse-width-modulation (PWM) or pulse-frequency-modulation (PFM), to control the ON and OFF states and duty cycles of power switch SW. The dynamic load detection circuit 404 includes a voltage divider which sets a voltage at node N1 based on the desired regulated output 403 voltage (e.g., V_REG). In one embodiment, the voltage divider includes resistors R1 and R2 which set the node N1 voltage according to the well known equation V_N1=R2/(R1+R2)*V_out. Note the R1-R2 voltage divider output at node N1 in the dynamic load detection circuit 404 is input to the negative terminal of a comparator 407.

Under normal operating conditions, when there is no dynamic load, the voltage V_out across the power supply output 403 is regulated by the primary controller 401 to the nominal V_REG voltage and thus, the voltage set (e.g., 5 Volts) at node N1 is relatively constant. In turn, when a dynamic load is connected, the voltage output V_out across the load LOAD drops as the output current I_out increases, and thus the voltage set at node N1 may also drop (e.g., to 4 Volts). Under normal operating conditions, with the negative input of comparator 407 coupled to node N1, and V_REF set to a threshold voltage (e.g., 4.5 Volts) below the nominal node N1 voltage, the output of comparator 407 is low and transistor Q1 is off. As a result, the opto-coupler 405 is also in the LOW state under normal operating conditions. Further, as the regulated output 403 is held at V_REG during no-load conditions, the opto-coupled 405 and comparator 407 are also off during no-load steady state operation. Therefore operation of the dynamic load detection circuit 404 and opto-coupler 405 minimally impact no-load and no dynamic load power consumption.

When a drop in the output voltage V_out occurs, such as due to a dynamic load being connected, the voltage at node N1, which is coupled to the output 403, also drops. In turn, if the voltage drop at node N1 reaches a threshold level, as determined by reference voltage V_REF received at the positive terminal of the comparator 407, the comparator 407 output goes HIGH. In turn, transistor Q1 turns on and provides a driving current to the opto-isolator 405. Accordingly, opto-isolator 405 is placed in the ON state when a drop in the output voltage is detected. The opto-isolator 405 generates and transmits an alert signal for the controller 401 on the detect pin DETECT of controller 401. Once controller 401 has received an alert signal, it may take the appropriate actions to maintain the output regulation of regulated output 403. On the other hand, with the control loop and loop gain stability based on the primary-only feedback signal 408, the bandwidth of dynamic load detection circuit 404 may be maximized without negatively impacting control loop stability. This allows for the rapid response by controller 401 when a dynamic load condition has been detected.

Figure 5A:
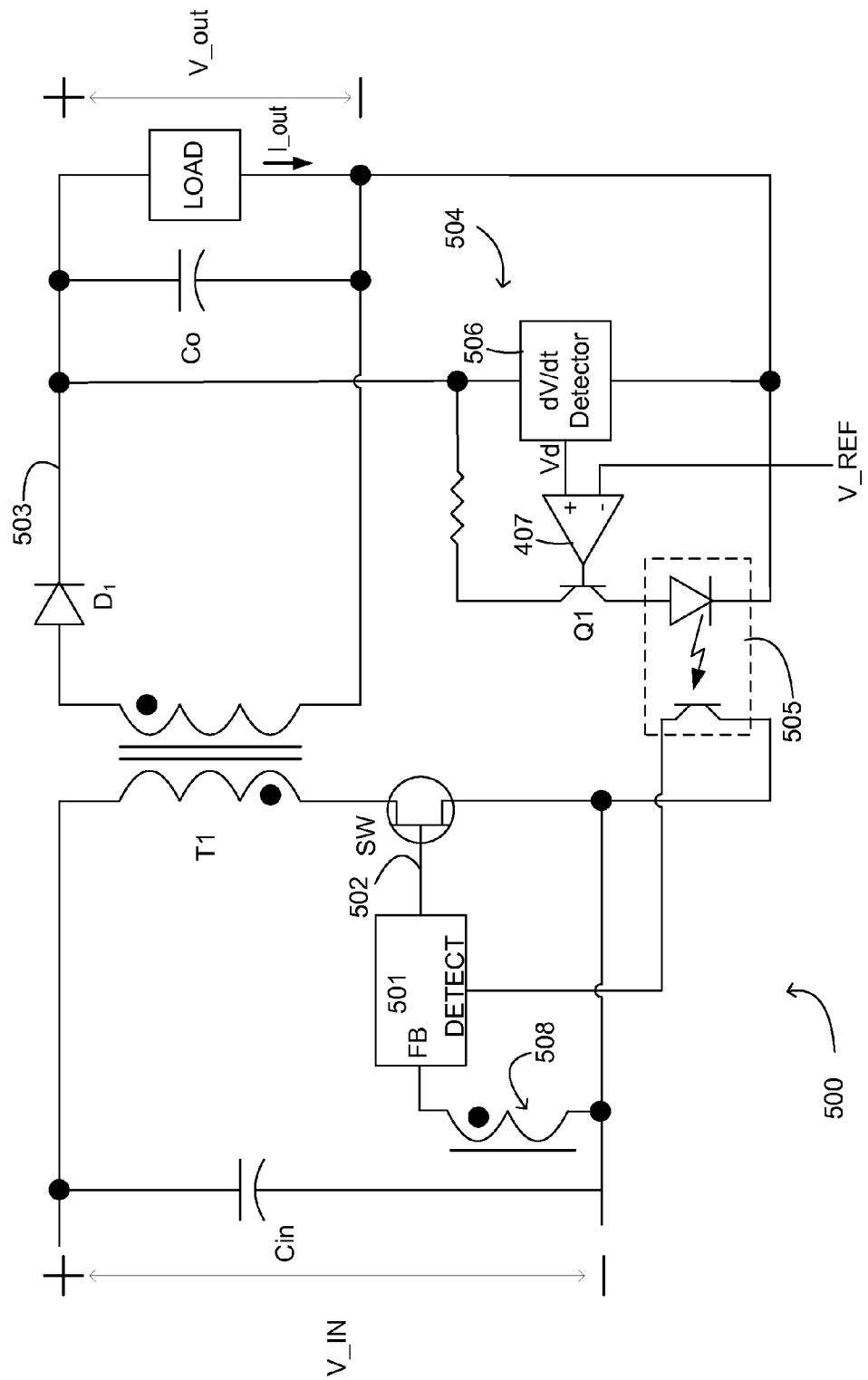

FIG. 5A illustrates another example embodiment of a flyback power converter 500 with a secondary-side dynamic load detection circuit 504 and primary-side feedback and control. Primary-side controller 501 provides a drive signal which defines the "ON" and "OFF" cycles at terminal 502 of the switch SW based on a primary-side feedback signal received at the feedback pin FB of the controller 501 from the auxiliary winding 508 of transformer T1.

The dynamic load detection circuit 504 senses changes in output voltage V_out on the regulated output 503 via detector 506. The detector 506 outputs a voltage Vd in response to changes in the voltage V_out at the output 503 of the power converter 500. In one embodiment, the magnitude of Vd is based on the rate of change in the regulated output voltage V_out. Under normal operating conditions when the output voltage V_out is tightly regulated, the rate of change is minimal and Vd is small. When the output voltage V_out drops rapidly, such as due to the coupling of a dynamic load to the output 503, the magnitude of Vd increases. Comparator 407 compares the magnitude of Vd at its positive input terminal with a threshold reference voltage V_REF at its negative terminal. Thus, with the detector 506 output Vd on the positive input of the comparator 407 and a sufficiently large V_REF threshold on the negative terminal for distinguishing dynamic load conditions from the nominal voltage waveform, the comparator 407 output coupled to switch Q1 is low under normal operating conditions. As a result, the opto-coupler 505 is also in the LOW state. Further, as the regulated output V_out is held at V_REG during no-load conditions, the opto-coupler 505 and comparator 407 are also off during no-load steady state operation. Therefore operation of the dynamic load detection circuit 504 and opto-coupler 505 minimally impact no-load and no dynamic load power consumption.

Figure 5B:
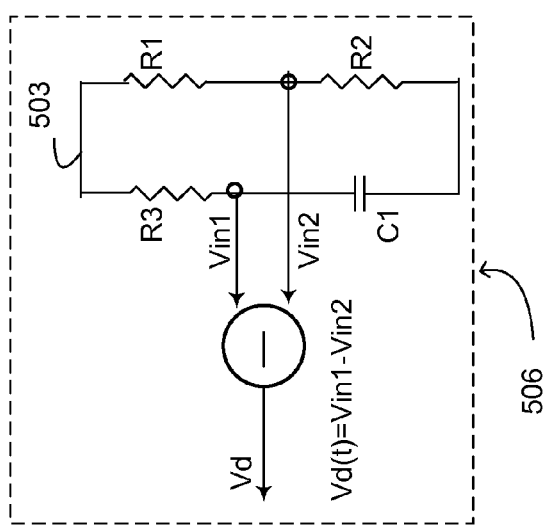
Figure 5C:
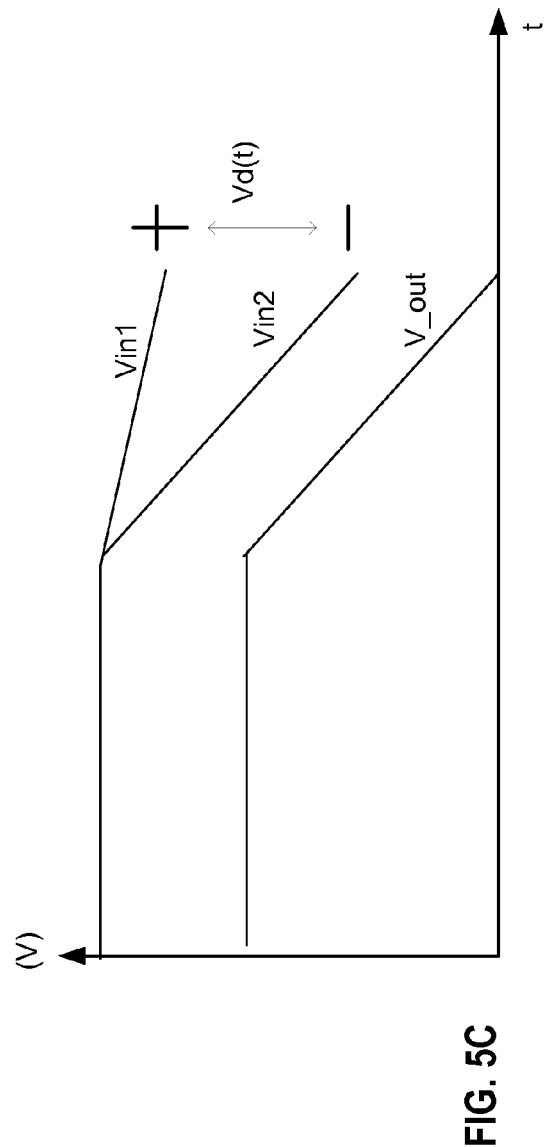

FIGS. 5B and 5C illustrate an example dV/dt detector 506 and corresponding waveforms, respectively, according to one embodiment. When a drop in the output voltage V_out at the regulated output 503 occurs, the detector 506 outputs a voltage Vd based on a difference between component voltages Vin1 and Vin2. Vin1 decreases slower than Vin2 according to an RC time constant of the detector 506 defined by resistor R3 and capacitor C1. Vin2 decreases with output voltage V_out according to a voltage divider output based on resistances R1 and R2. The difference Vd of Vin1 and Vin 2 describes the rate of change (dV/dt) of the regulated output 503.

Referring again to FIG. 5A, the comparator 407 compares Vd with reference voltage V_REF. V_REF sets the threshold determining if a dynamic load condition is present. Once Vd (e.g., as shown in FIG. 5C) exceeds V_REF, thusly indicating a dynamic load condition, transistor Q1 is turned ON and the opto-isolator 505 generates and transmits an alert signal on the detect pin DETECT of controller 501. Hence, opto-isolator 505 is placed in the ON state when a rapid drop in the output voltage V_out is detected. Once controller 501 has received an alert signal, it may take the appropriate actions to maintain the output regulation of regulated output 503. With the control loop and loop gain stability based on the primary-only feedback signal from auxiliary winding 508, the bandwidth of dynamic load detection circuit 504 may be maximized without negatively impacting control loop stability. This allows for the rapid response by controller 501 when a dynamic load condition has been detected. Otherwise, the remaining parts of power converter 500 are similar to those corresponding parts of power converter 400 in FIG. 4.

Figure 6A:
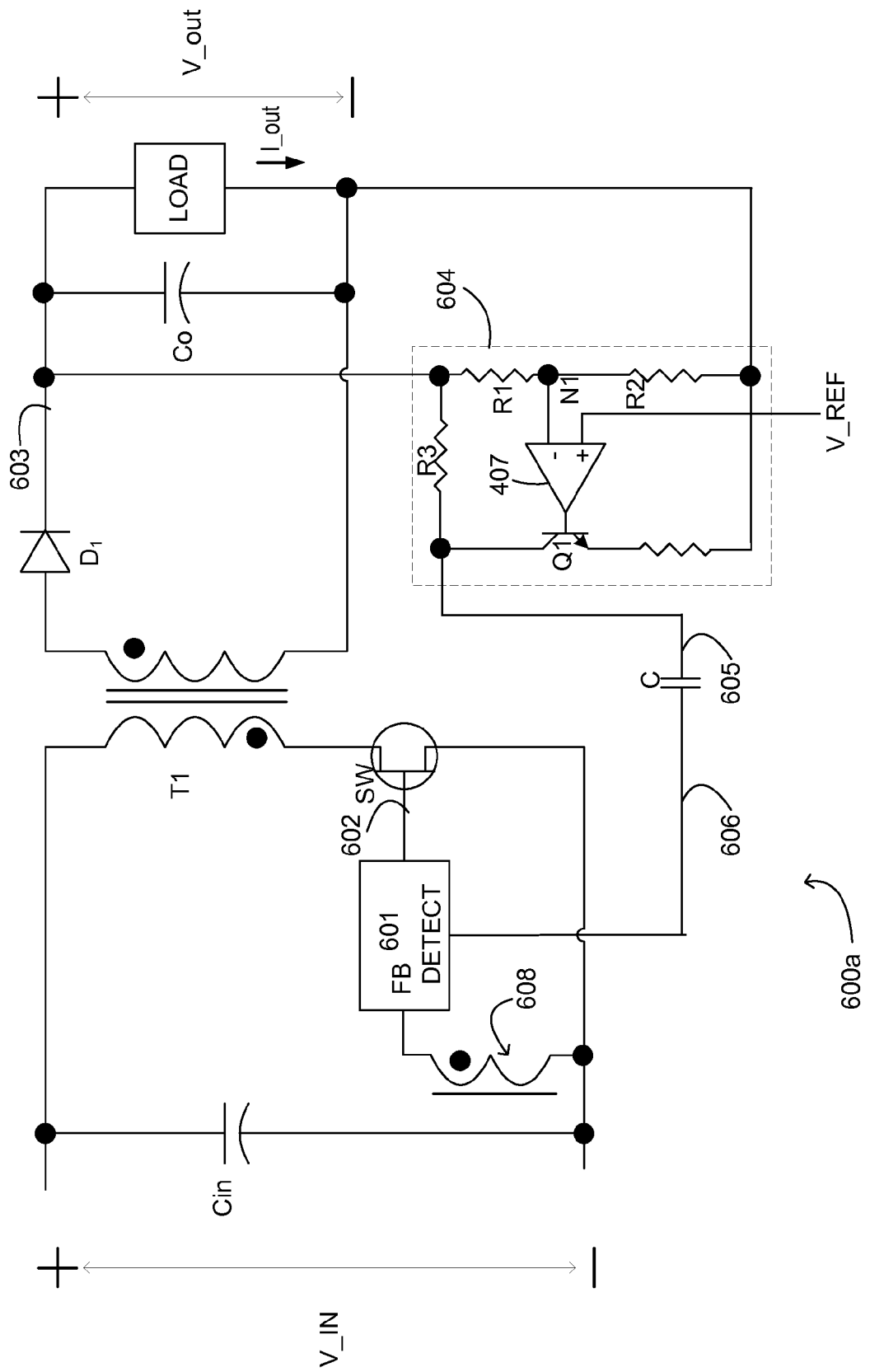
Figure 6B:
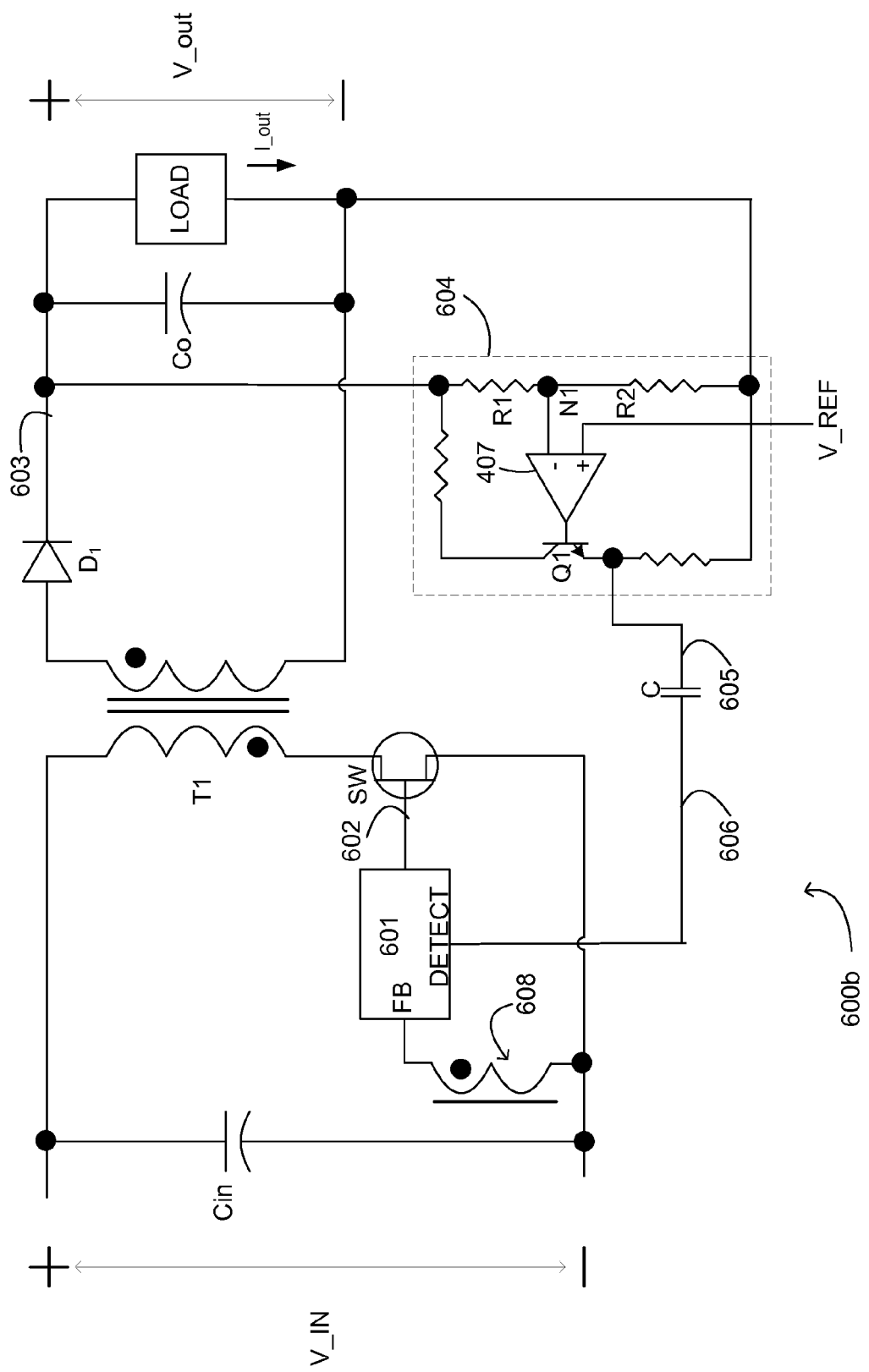
Figure 6C:
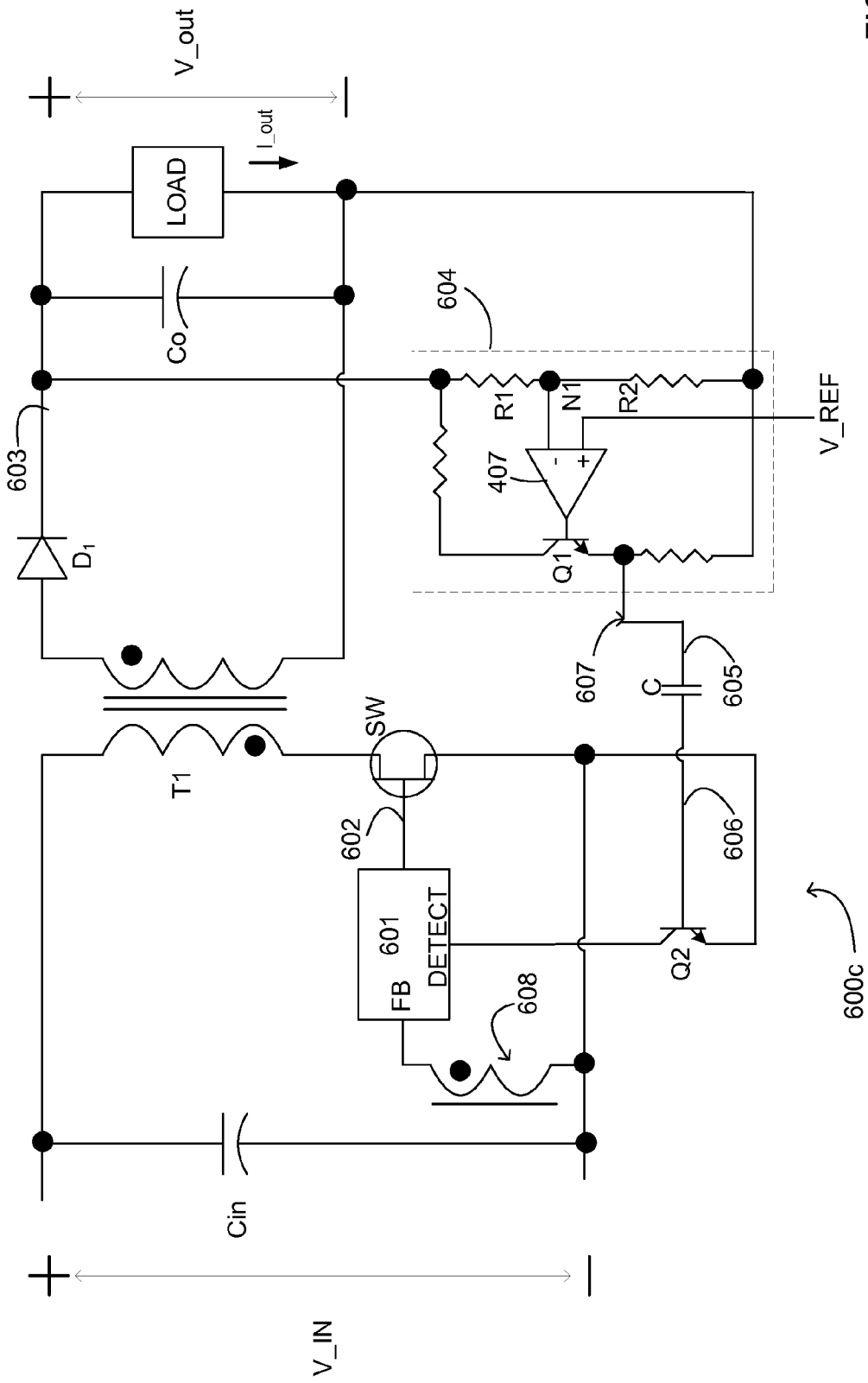

FIGS. 6A 6B, and 6C illustrate additional example embodiments of a flyback power converter 600 with a secondary-side dynamic load detection circuit 604 and primary-side feedback and control. Referring to FIG. 6A, the primary-side controller 601 provides a drive signal which defines the "ON" and "OFF" cycles at terminal 602 of the switch SW based on a primary-side feedback signal received at the feedback pin FB of the controller 601 from the auxiliary winding 608 of transformer T1.

The dynamic load detection circuit 604 sets node N1 voltage based on the voltage V_out on the regulated output 603 of the power converter 600a via a voltage divider. In one embodiment, the voltage divider includes resistors R1 and R2. Note that the voltage divider output at node N1 in the dynamic load detection circuit 604 is input to the negative input terminal of the comparator 407. Accordingly, under normal operation conditions when no drop is detected in regulated output voltage V_out, the comparator negative input may be nominally higher than reference voltage V_REF at the comparator 407 positive input terminal, thus causing the comparator 407 output to be LOW. As a result, the voltage at terminal 605 of capacitor C is proximate to the regulated output voltage V_out, and is HIGH. However, no current flows through capacitor C, and thus the voltage at terminal 606 of capacitor C is close to that of terminal 605. This is because there is no substantial change in the voltage difference across capacitor C. Consequently, the detection circuit 604 consumes minimal power during no dynamic load and at no-load steady state conditions.

When a drop in the output voltage V_out occurs, as determined by comparison of the node N1 voltage with reference voltage V_REF at the comparator 407, the comparator 407 output coupled to the gate of transistor Q1 is driven HIGH, which turns the transistor Q1 ON. As a result, the voltage potential at terminal 605 of the capacitor C is pulled down from HIGH to LOW. Accordingly, the voltage potential at terminal 606 of the capacitor C is also pulled down from HIGH to LOW as well. As capacitors have the property that the voltage difference across capacitors do not change instantaneously, the capacitor C generates a negative pulse at the detect pin DETECT of the primary controller 601. After the negative pulse, the voltage potential at terminal 606 of the capacitor C may rise back to HIGH, depending on the circuit design and time constant of capacitor C and resistor R3.

The generated negative pulse is sufficient to serve as a wake up or alert signal to the primary controller 601 that a drop in output voltage V_out has been detected. Thus, an alert signal is generated and transmitted via coupling capacitor C. Coupling capacitor C transmits the alert signal to controller 601 in addition to providing galvanic isolation between the primary-side and secondary-side of the power converter 600a. Once controller 601 receives an alert signal, it may take the appropriate actions to maintain the output regulation of regulated output 603. With the control loop and loop gain stability based on the primary-only feedback signal from auxiliary winding 608, the bandwidth of dynamic load detection circuit 604 may be maximized without negatively impacting control loop stability. This allows for the rapid response by controller 601 when a dynamic load condition has been detected. Otherwise, the remaining parts of power converter 600a are similar to those corresponding parts of power converter 400 in FIG. 4.

Now referring to FIG. 6B, instead of using a negative pulse as the alert signal, a positive pulse may be generated. The embodiment of the switching power converter 600b shown in FIG. 6B illustrates a pulse scheme where voltage potentials at terminals 605 and 606 are LOW under normal operating conditions (e.g., before a drop in the output voltage is detected). Once a drop in output voltage is detected, voltage potentials at terminals 605 and 606 of the capacitor C change from LOW to HIGH to generate a positive pulse at the detect pin DETECT of the controller 601. Otherwise, the remaining parts of power converter 600b are similar to those corresponding parts of power converter 400 in FIG. 4.

In some instance, the capacitor C coupling may be insufficient to create a sharp enough alert signal for the controller 601 to detect the dynamic load condition. In order to sharpen the pulse, an amplifying circuit may be added. One embodiment of the flyback power converter 600c including amplifier is shown in FIG. 6C. As shown, a transistor Q2 is coupled to the detect pin DETECT of the primary controller 601. In one embodiment, the transistor Q2 in an NPN transistor that receives the voltage of terminal 606 and generates an amplified negative pulse when the dynamic load condition is detected. Otherwise, the remaining parts of power converter 600c are similar to those corresponding parts of power converter 400 in FIG. 4. Other embodiments may use different circuit implementation and alert signal polarities.

Figure 7:
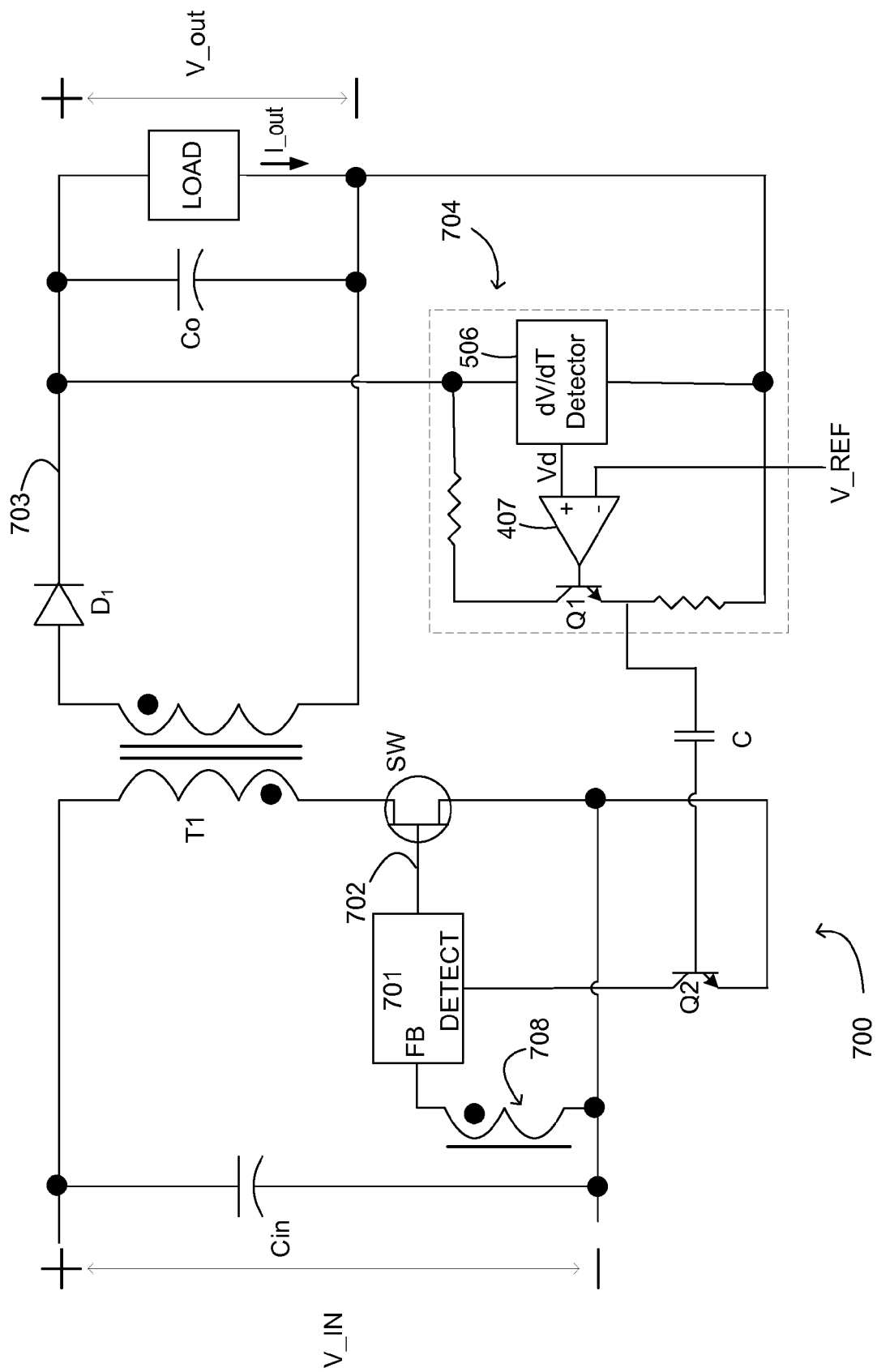

FIG. 7 illustrates another example embodiment of a flyback power converter 700 with a secondary-side dynamic load detection circuit 704 and primary-side feedback and control. Primary-side controller 701 provides a drive signal which defines the "ON" and "OFF" cycles at terminal 702 of the switch SW based on a primary-side feedback signal received at the feedback pin FB of the controller 701 from the auxiliary winding 708 of transformer T1.

The dynamic load detection circuit 704 senses the rate of change in output voltage V_out on the regulated output 703 via detector 506. The detector 506 outputs a voltage Vd corresponding to the rate of change of the output voltage V_out which is compared with a threshold V_REF at the comparator 407. The detection circuit 704 consumes no or very little power at no-load steady state conditions.

Reference voltage V_REF sets the threshold for determining whether a dynamic load condition is present. Once a dynamic load condition has been detected, the coupling capacitor C generates a pulse at transistor Q2, which is coupled to the detect pin DETECT of the primary controller 601. The transistor Q2 amplifies the pulse and outputs an alert signal on the detect pin DETECT of the primary controller 601.

Once controller 701 receives an alert signal, it may take the appropriate actions to maintain the output regulation of regulated output 703. With the control loop and loop gain stability based on the primary-only feedback signal from auxiliary winding 708, the bandwidth of dynamic load detection circuit 704 may be maximized without negatively impacting control loop stability. This allows for the rapid response by controller 701 when a dynamic load condition has been detected. The embodiment shown in FIG. 7 creates a negative pulse via coupling capacitor C as the alert signal. By using an NPN transistor Q2 to amplify the capacitor C coupling strength, an amplified pulse is generated on the detect pin DETECT of the primary control 701 after the drop in output voltage is detected with the secondary-side dynamic load detection circuit 704. Otherwise, the remaining parts of power converter 700 are similar to those corresponding parts of power converter 400 in FIG. 4. Similar to the embodiments in FIGS. 6A-6C, different circuit implementation and alert signal polarities can be used.

Figure 8A:
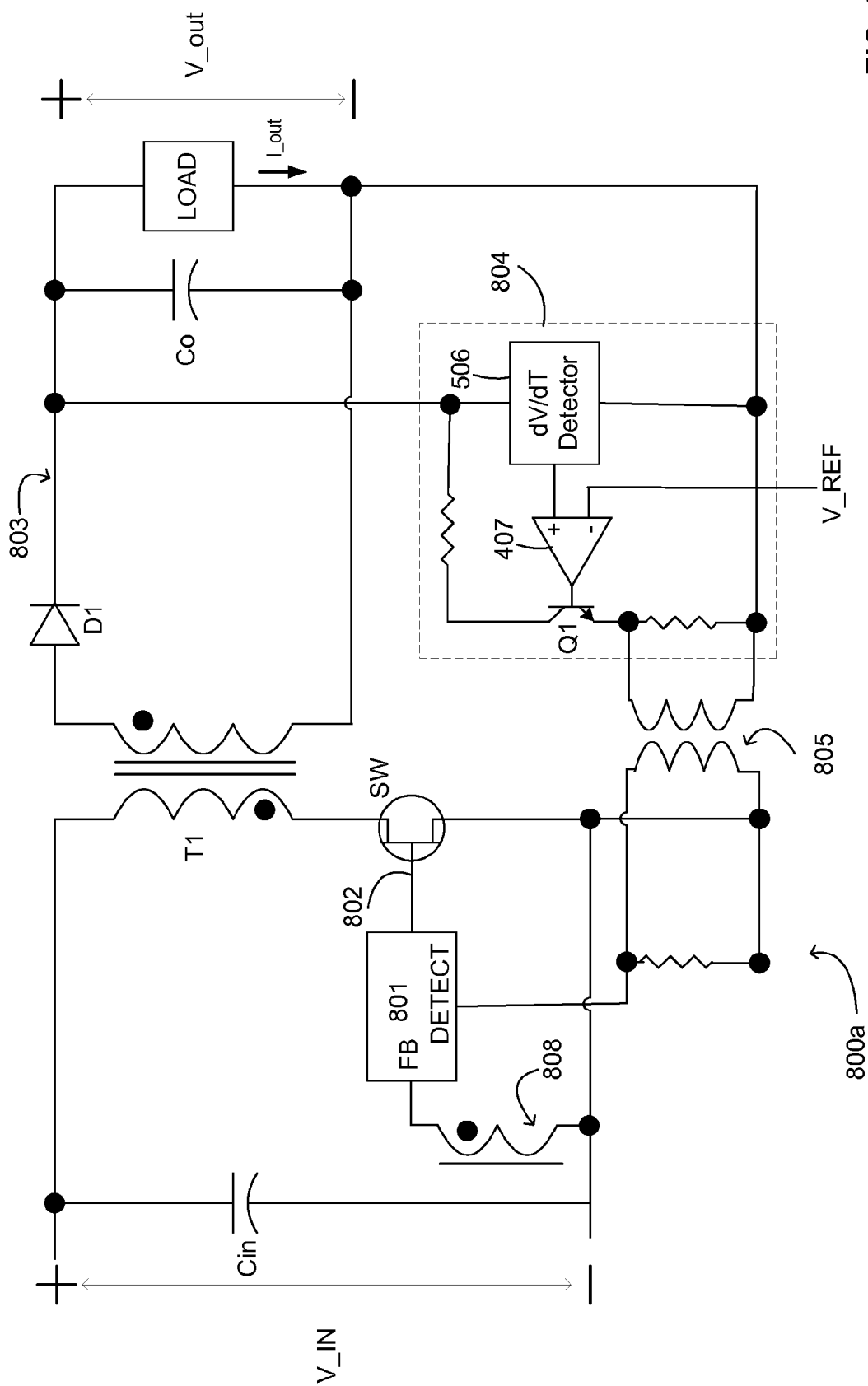

FIG. 8A illustrates another example embodiment of a flyback power converter 800a with a secondary-side dynamic load detection circuit 804 and primary-side feedback and control. Primary-side controller 801 provides a drive signal which defines the "ON" and "OFF" cycles at terminal 802 of the switch SW based on a primary-side feedback signal received at the feedback pin FB of the controller 801 from the auxiliary winding 808 of transformer T1.

A coupling transformer 805 is used to generate an alert signal applied at the detect pin DETECT of controller 601. The coupling transformer 805 also provides galvanic isolation between the primary side and secondary side of the power converter 800a. The dynamic load detection 804 may be performed using dV/dt detector 506 as shown or a voltage divider (as previously described). Additionally, in some embodiments, the coupling transformer 805 may be part of the main power transformer T1 rather than a separate sensing signal transformer as shown in FIG. 8A. The coupling transformer 805 may be configured for use with forward or flyback topologies. In either case, an alert signal may be generated and transmitted to the detect pin DETECT of the primary controller 801 through the coupling transformer 805. Otherwise, the remaining parts of power converter 800a are similar to those corresponding parts of power converter 400 in FIG. 4.

In some configurations, the magnetic coupling of switching noise from power switch SW and parasitic ringing follows, and thus the alert signal generated for secondary-side dynamic load regulation using controller 601 via coupling transformer 805 at the detect pin DETECT may be impacted.

Figure 8B:
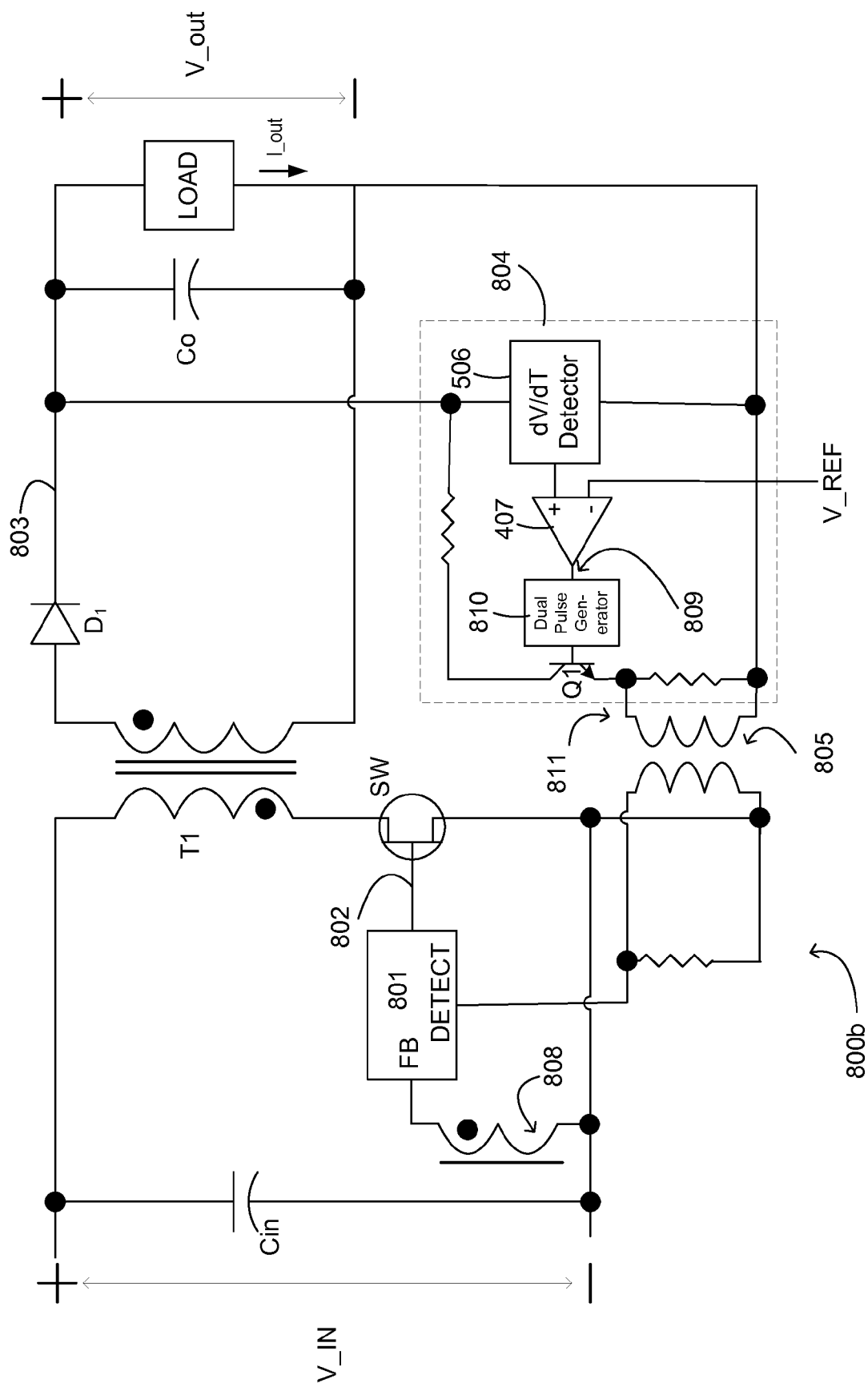

FIG. 8B illustrates an embodiment of a switching power converter 800b where a dual pulse generator 810 is added to convert a signal received from dV/dT Detector 506 output 809 into two pulses to drive transistor Q1. In turn, the coupling transformer 805 receives the dual-pulse signal at its secondary-side for transmission via the primary-side to the detect pin DETECT of controller 801. In one embodiment, the width of the dual-pulse is designed such that the alert signal is comfortably transmitted to the primary-side of the coupling transformer 805. Further, the interval between the two pulses may be designed such that the interval is longer than the nominal power switch SW ON time, main transformer reset time, and the following parasitic ringing time at light load or no load conditions. The dual pulse configuration ensures reliability of the alert signal as seen by the primary-side controller 801. The dual pulse generator 810 may be implemented with digital timers and/or analog RC circuits whose operation is initiated in response to comparator 407 output signal 809. Otherwise, the remaining parts of power converter 800b are similar to those corresponding parts of power converter 400 in FIG. 4.

Figure 9:
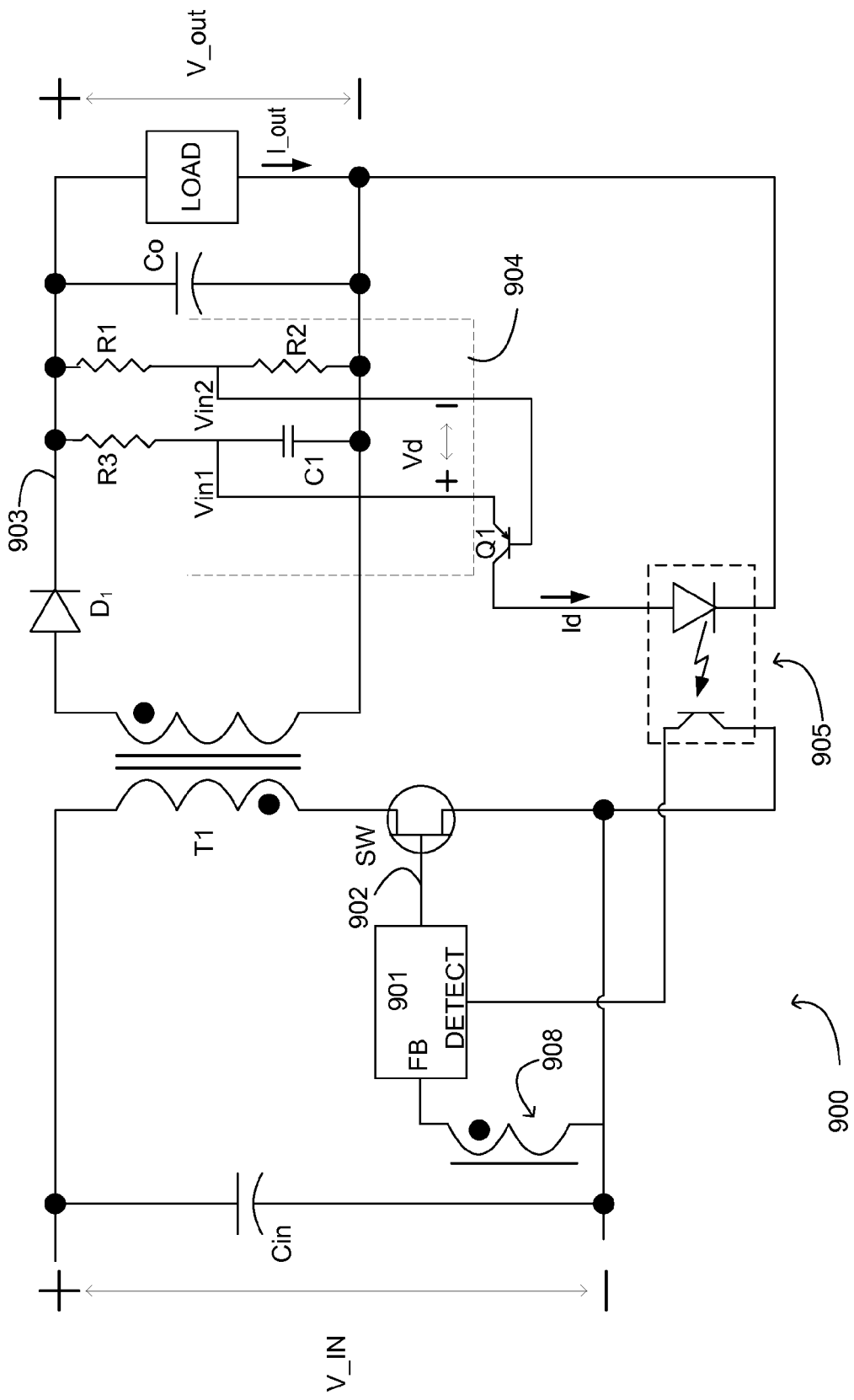

FIG. 9 is a circuit diagram of a flyback switching power converter 900 with a simplified architecture for implementing dynamic load detection via a transistor Q1. In one embodiment the transistor Q1 in a PNP transistor. As explained with reference to FIG. 5B, a load transient detector 904 outputs a voltage difference Vd in the event output load LOAD suddenly increases. When voltage difference Vd exceeds the threshold voltage of the transistor Q1, the transistor Q1 conducts current Id to the primary side via opto-coupler 905, which generates an alert signal on the detect pin DETECT of the primary side controller 901.

Once controller 901 has received an alert signal, it may take the appropriate action to bring up output voltage to the nominal regulated level without negatively impacting control loop stability. Note during normal operations when there is no detected drop in voltage V_out on regulated output 903, the transistor Q1 remains in off-state. As a result, the detection circuit 904 consumes minimal power during normal operation conditions including no-load steady state operations.

Otherwise, the remaining parts of power converter 900 are similar to those corresponding parts of power converter 400 in FIG. 4.

Figures 10A, 10B:
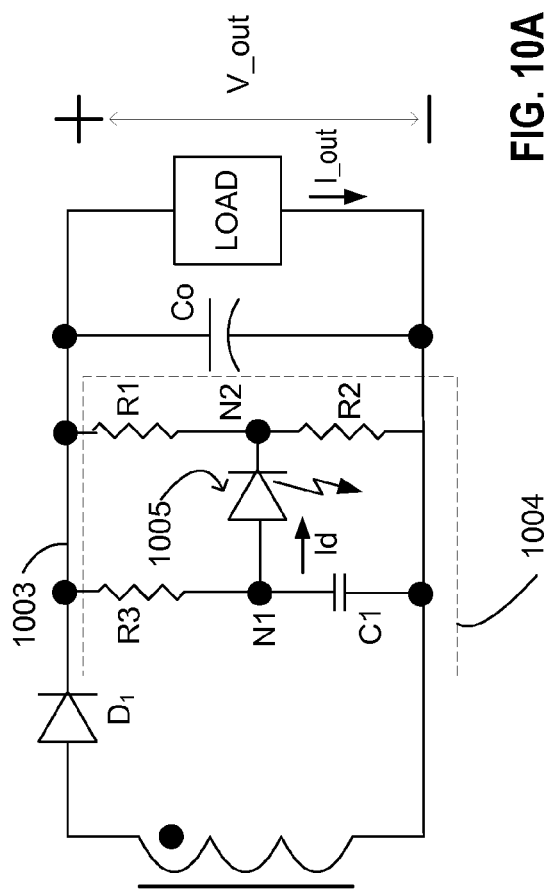

FIG. 10A and FIG. 10B illustrate additional example embodiments of further simplified dynamic load detection schemes. In both FIGS. 10A and 10B, during an event when output load LOAD suddenly increases, the RC circuit of resistor R3 and capacitor C1 will momentarily maintain the voltage at node N1 (the anode of opto-coupler 1005) proximate to the nominal output voltage. In contrast, the voltage at node N2 (the cathode of the opto-coupler 1005) will drop substantially linearly with the output voltage causing the opto-coupler 1005 to generate an alert signal (e.g., which may be received on the detect pin of a primary side controller, as described below). In FIG. 10A, the voltage at node N2 is scaled down from the output voltage, such that a bias voltage is applied between node N1 and N2 across the opto-coupler 1005. As result, the opto-coupler 1005 will be more sensitive to the level of output voltage drop required for generating the alert signal. In response to the voltage drop at the output, current Id flows through the secondary-side of the opto-coupler 1005. The opto-coupler 1005 generates the alert signal on its primary-side (not shown), which may be coupled to the detect pin of a primary side controller (not shown). During nominal operation, no voltage difference exists across the opto-coupler, thus the detection circuit 1004 consumes minimal power for both schemes.

Figure 11A:
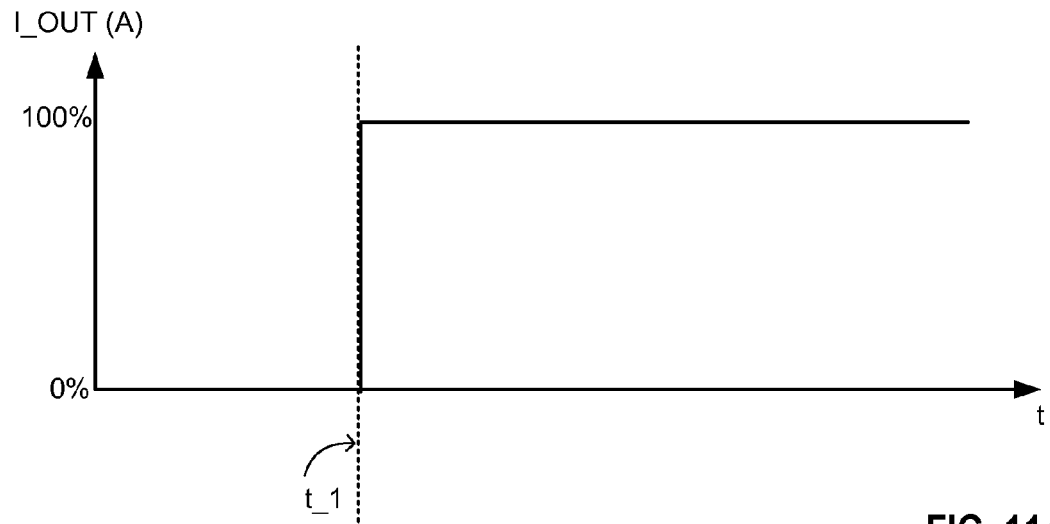
FIGS. 11A, and 11B illustrate example waveforms corresponding to an example power converter with secondary-side dynamic load detection and primary-side feedback and control.
Figure 11B:
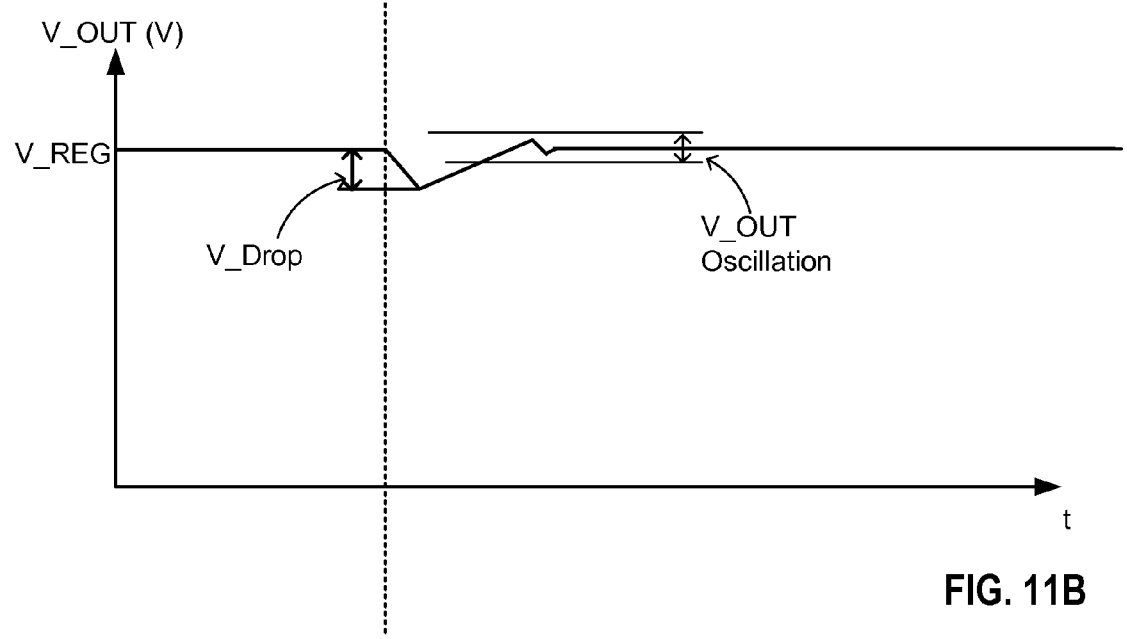

FIGS. 11A and 11B illustrate example waveforms corresponding to an example power converter with secondary-side dynamic load detection and primary-side feedback and control, such as those illustrated in FIGS. 4-10. As stated above, with the dedicated dynamic load detection circuit, which may be implemented independent of the feedback and control loop, the bandwidth for detecting dynamic loads may be maximized. This results in a reduced voltage drop V_Drop caused by a dynamic load condition (e.g., at time t_1) as well as the minimization of the magnitude and duration of voltage oscillations (V_OUT Oscillation) in the regulated output voltage of the switching power converters. Additionally, the dynamic load detection circuits illustrated herein may be configured to only be active when a drop in the output voltage is detected, and thus minimally impact power consumption.

Upon reading this disclosure, those of skill in the art will appreciate still additional alternative designs for the system. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in any claims drawn to the subject matter herein.

What is claimed is:

1. A switching power converter, comprising:
   a transformer coupled between an input and an output of the switching power converter, the transformer including a primary winding coupled to the input to receive an input voltage and a secondary winding coupled to the output of the switching power converter;
   a switch coupled to the primary winding of the transformer, current through the primary winding being generated while the switch is turned on and not being generated while the switch is turned off;
   a controller at a primary winding side of the transformer and configured to generate a control signal to turn on or turn off the switch, the switch being turned on responsive to the control signal being in a first state and the switch being turned off responsive to the control signal being in a second state;
   a feedback circuit at the primary winding side of the transformer and configured to generate a feedback signal indicative of an output voltage at the output of the switching power converter;
   a load detection circuit at a secondary winding side of the transformer and separate from the feedback circuit, the load detection circuit configured to detect a dynamic load condition occurring at a transition time from a disconnected state to a connected state between a load and the output of the switching power converter, the load detection circuit further configured to generate an alert signal indicative of the detected dynamic load condition; and
   a coupling circuit coupled to the load detection circuit at the secondary winding side of the transformer and to the controller at the primary winding side of the transformer, the coupling circuit configured to transmit the alert signal generated by the load detection circuit to the controller,
   wherein the controller is configured to regulate the output voltage based on the feedback signal generated at the primary winding side of the transformer while detecting and responding to the dynamic load condition based on the alert signal generated at the secondary winding side of the transformer.

2. The switching power converter of claim 1, wherein the load detection circuit generates the alert signal indicative of the detected dynamic load condition in response to the output voltage at the output of the switching power converter dropping below a predetermined threshold voltage.

3. The switching power converter of claim 2, wherein the load detection circuit comprises:
   a comparator configured to compare the output voltage at the output of the switching power converter with a reference voltage to generate a drive signal when the output voltage at the output of the switching power converter falls below the reference voltage; and
   a transistor configured to generate the alert signal indicative of the detected dynamic load condition responsive to the generated drive signal.

4. The switching power converter of claim 1, wherein the load detection circuit generates the alert signal indicative of the detected dynamic load condition in response to the output voltage at the output of the switching power converter decreasing at a rate of change greater than a predetermined threshold rate of change.

5. The switching power converter of claim 4, wherein the load detection circuit includes a dv/dt detector coupled to the output of the switching power converter and configured to generate a signal indicative of the rate of change in the output voltage at the output of the switching power converter.

6. The switching power converter of claim 5, wherein the load detection circuit further includes:
   a comparator configured to compare the signal indicative of the rate of change in the output voltage with a reference signal and generate a drive signal when the signal indicative of the rate of change in the output voltage exceeds the reference signal; and
   a transistor configured to generate the alert signal indicative of the detected dynamic load condition responsive to the generated drive signal.

7. The switching power converter of claim 5, wherein the dv/dt detector comprises:

a voltage divider configured to generate a first voltage that decreases substantially proportional to the output voltage at the transition time when the load is connected to the output of the switching power converter; and a RC circuit coupled in parallel to the voltage divider and configured to generate a second voltage that represents the output voltage decreased according to a resistor-capacitor time constant of the RC circuit.

8. The switching power converter of claim 7, wherein the dv/dt detector outputs a difference between the first voltage and the second voltage to indicate the rate of change in the output voltage.

9. The switching power converter of claim 7, wherein the load detection circuit comprises a transistor switch configured to generate the alert signal in response to a difference between the first voltage and the second voltage exceeding a threshold voltage for activating the transistor switch, wherein the predetermined threshold rate is based on the threshold voltage of the transistor switch.

10. The switching power converter of claim 7, wherein a secondary side of the coupling circuit is coupled between the voltage divider and the RC circuit and is configured to generate the alert signal in response to a difference between the first voltage and the second voltage exceeding the predetermined threshold rate of change.

11. The switching power converter of claim 4, wherein the load detection circuit comprises:
a RC circuit coupled configured to generate a voltage that represents the output voltage decreased according to a resistor-capacitor time constant of the RC circuit; and
wherein a secondary side of the coupling circuit is coupled between the RC circuit and the output of the power converter and is configured to generate the alert signal in response to a difference between said voltage and the output voltage exceeding the predetermined threshold rate of change in the output voltage.

12. The switching power converter of claim 1, wherein the feedback circuit comprises an auxiliary winding of the transformer on the primary winding side, the auxiliary winding configured to generate the feedback signal reflecting the output voltage at the output of the switching power converter.

13. The switching power converter of claim 1, wherein the coupling circuit comprises one of: a capacitive coupling circuit, an inductive coupling circuit, or an optical coupling circuit to electrically isolate the primary winding side from the secondary winding side.

14. The switching power converter of claim 1, wherein the power converter comprises an amplifier coupled between the coupling circuit and the controller to amplify the alert signal.

15. The switching power converter of claim 1, wherein the dynamic load condition is characterized by a drop in the output voltage at the output of the power converter with increase in current through the load.

16. A method of operating a switching power converter, the switching power converter including a transformer coupled between an input and an output of the switching power converter, the transformer including a primary winding coupled to the input to receive an input voltage and a secondary winding coupled to the output of the switching power converter, a switch coupled to the primary winding of the transformer, current through the primary winding being generated while the switch is turned on and not being generated while the switch is turned off, and a controller at a primary winding side of the transformer and configured to generate a control signal to turn on or turn off the switch, the switch being turned on responsive to the control signal being in a first state and the switch being turned off responsive to the control signal being in a second state, the method comprising:
generating a feedback signal indicative of an output voltage at the output of the switching power converter with a feedback circuit at the primary winding side of the transformer;
detecting a dynamic load condition occurring at a transition time from a disconnected state to a connected state between a load and the output of the switching power converter with a load detection circuit at a secondary winding side of the transformer, the load detection circuit separate from the feedback circuit and configured to generate an alert signal indicative of the detected dynamic load condition; and
transmitting the alert signal generated by the load detection circuit at the secondary winding side of the transformer to the controller on the primary winding side of the transformer using a coupling circuit coupled to the load detection circuit at the secondary winding side of the transformer and to the controller at the primary winding side of the transformer,
wherein the controller regulates the output voltage based on the feedback signal generated at the primary winding side of the transformer while detecting and responding to the dynamic load condition based on the alert signal generated at the secondary winding side of the transformer.

17. The method of claim 16, wherein the load detection circuit generates the alert signal indicative of the detected dynamic load condition in response to the output voltage at the output of the switching power converter dropping below a predetermined threshold voltage.

18. The method of claim 16, wherein the load detection circuit generates the alert signal indicative of the detected dynamic load condition in response to the output voltage at the output of the switching power converter decreasing at a rate of change greater than a predetermined threshold rate of change.

* * * * *